(12) United States Patent
Huang

(10) Patent No.: US 10,401,987 B2
(45) Date of Patent: Sep. 3, 2019

(54) MOUSE DEVICE WITH ARMREST HEIGHT ADJUSTMENT FUNCTION

(71) Applicant: Primax Electronics Ltd., Taipei (TW)

(72) Inventor: Shu-An Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 51 days.

(21) Appl. No.: 15/906,056

(22) Filed: Feb. 27, 2018

(65) Prior Publication Data

US 2019/0155402 A1 May 23, 2019

(30) Foreign Application Priority Data

Nov. 17, 2017 (TW) .............................. 106139925 A

(51) Int. Cl.
*G06F 3/039* (2013.01)
*A47C 16/00* (2006.01)
*G06F 3/0354* (2013.01)

(52) U.S. Cl.
CPC .............. *G06F 3/039* (2013.01); *A47C 16/00* (2013.01); *G06F 3/03543* (2013.01)

(58) Field of Classification Search
CPC ..................................................... G06F 3/039

USPC ........................................................ 345/163
See application file for complete search history.

(56) References Cited

U.S. PATENT DOCUMENTS

| 2015/0261324 A1* | 9/2015 | Huang | G06F 3/03543 345/163 |
| 2017/0192536 A1* | 7/2017 | Wang | G06F 3/03543 |
| 2018/0011558 A1* | 1/2018 | Chao | G06F 3/03543 |

* cited by examiner

*Primary Examiner* — Long D Pham
(74) *Attorney, Agent, or Firm* — Kirton McConkie; Evan R. Witt

(57) ABSTRACT

A mouse device includes a mouse body, an armrest and an armrest lifting module. The armrest is pivotally coupled to the mouse body. The armrest lifting module includes a support element, a height-adjusting elastic element, a first coupling element, a second coupling element, a push element and a slid switch. The two ends of the support element include a connection segment and a free segment, respectively. The connection segment is connected with the armrest. The free segment is penetrated through the mouse body and disposed within the mouse body. The height-adjusting elastic element is sheathed around the support element. The first coupling element is connected with the free segment, and includes a coupling rack. The push element is installed within the mouse body. The push element is movable to push the second coupling element. The slide switch is connected with the push element.

15 Claims, 4 Drawing Sheets

MOUSE DEVICE WITH ARMREST HEIGHT ADJUSTMENT FUNCTION

FIELD OF THE INVENTION

The present invention relates to a mouse device with an armrest height adjustment function.

BACKGROUND OF THE INVENTION

While a mouse device is used to edit electronic documents, make electronic engineering drawings or play computer games, the user's palm is usually placed on an armrest of the mouse device. Since the user's palm is supported on the armrest of the mouse device, the user can move the mouse more easily and use the finger to press the button of the mouse device.

Conventionally, a mouse device comprises a mouse body, a roller module and a button module. The roller module and the button module are installed on the mouse body. The mouse body has an armrest region beside the button module and the roller module. The user's palm can be supported on the armrest region.

However, the conventional mouse device still has some drawbacks. For example, the sizes of the palms of different users are not identical, and the volume of the conventional mouse device is fixed. Since it is impossible to adjust the volume of the mouse device according to the size of the user's palm, the comfort of using the mouse device is usually unsatisfied to the user.

SUMMARY OF THE INVENTION

An object of the present invention provides a mouse device with an armrest height adjustment function.

In accordance with an aspect of the present invention, there is provided a mouse device with an armrest height adjustment function. The mouse device includes a mouse body, an armrest and an armrest lifting module. The armrest is covered on the mouse body and pivotally coupled to the mouse body. The armrest lifting module includes a support element, a height-adjusting elastic element, a first coupling element, a second coupling element, a push element and a slide switch. The two ends of the support element include a connection segment and a free segment, respectively. The connection segment is connected with the armrest. The free segment is penetrated through the mouse body and disposed within the mouse body. The height-adjusting elastic element is sheathed around the support element. The height-adjusting elastic element is arranged between the mouse body and the armrest. The first coupling element is protruded from the free segment, and includes a coupling rack. The second coupling element is installed within the mouse body, and aligned with the coupling rack. The push element is installed within the mouse body. The push element is located under the second coupling element. Moreover, the push element is movable to push the second coupling element. The slide switch located at a side of the mouse body and connected with the push element. While the slide switch is moved and the push element is correspondingly moved to push the second coupling element upwardly, the second coupling element is engaged with the coupling rack.

In an embodiment, the mouse body includes an upper case and a lower case. The upper case is covered on the lower case. An accommodation space is formed between the upper case and the lower case. The first coupling element, the second coupling element and the push element are disposed within the accommodation space. The armrest is covered on the upper case and pivotally coupled to the upper case. The free segment is penetrated through the upper case and disposed within the accommodation space. The height-adjusting elastic element is arranged between the upper case and the armrest. The slide switch is located at a side of the lower case.

In an embodiment, the mouse body further includes two first linkage rods, and the two first linkage rods are protruded from the upper case toward the armrest. Moreover, two second linkage rods are protruded from the armrest toward the upper case, and the first linkage rods are pivotally coupled to the corresponding second linkage rods. The first linkage rods are pivotally coupled to the corresponding second linkage rods, so that the mouse body is connected with the armrest. Preferably, the two first linkage rods and the two second linkage rods are located at two opposite sides of the height-adjusting elastic element, respectively. Preferably, the mouse body further includes two buttons. The two buttons are covered on the upper case. The two buttons are located beside the armrest. The two first linkage rods and the two second linkage rods are arranged between the armrest and the upper case and located near the two buttons.

In an embodiment, the first coupling element is an arc-shaped strip with a convex curvy surface. The convex curvy surface is located at a side of the first coupling element away from the support element. The coupling rack is formed on the convex curvy surface. Preferably, a first end of the second coupling element has a pivotal end, and a second end of the second coupling element has an engaging segment. The second coupling element is pivotally coupled to the lower case through the pivotal end and connected with the mouse body. The engaging segment is aligned with the coupling rack.

In an embodiment, the engaging segment has a first surface close to the first coupling element, and the first surface of the engaging segment is a contact surface. An engaging rack is formed on the contact surface of the second coupling element, and the engaging rack matches the coupling rack. Preferably, the contact surface is a concave curvy surface corresponding to the convex curvy surface of the first coupling element. Preferably, the engaging segment has a second surface away from the first coupling element, and the second surface of the engaging segment is a pushed surface. While the push element is moved along the pushed surface, the engaging segment is pushed by the push element and rotated upwardly with respect to the pivotal end, so that the engaging rack is engaged with the coupling rack. Preferably, a thickness of the engaging segment is gradually decreased in a direction from a positon near the pivotal end to a position away from the pivotal end. Consequently, the structural stability of the mouse device is increased, and the use life of the mouse device is prolonged.

In an embodiment, a first end of the push element is connected with the slide switch, and a second end of the push element has a push block. The push block is located under the engaging segment to push the pushed surface. Moreover, the push block is movable along the pushed surface in a direction from a position away from the pivotal end to a positon near the pivotal end. The push block has a slant surface near the pushed surface. Preferably, a thickness of the push block is gradually decreased in a direction from a position away from the pivotal end to a positon near the pivotal end.

In an embodiment, a sliding recess is formed in a surface of the lower case and in communication with the accommodation space. The slide switch is installed in the sliding recess and movable along the sliding recess. An end of the push element away from the push element is connected with the slide switch. Preferably, the height-adjusting elastic element is a spring, and the support element is hollow post.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
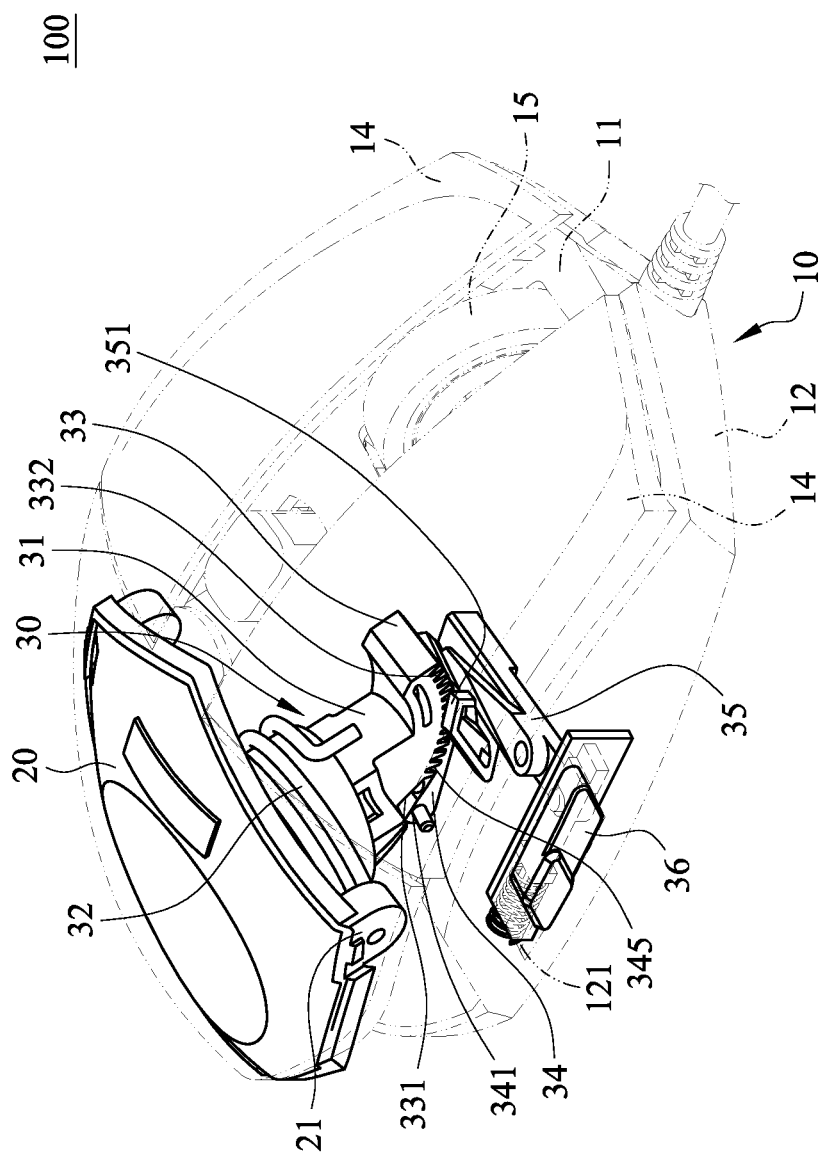
FIG. 1 is a schematic perspective view illustrating a mouse device with an armrest height adjustment function according to an embodiment of the present invention.
Figure 2:
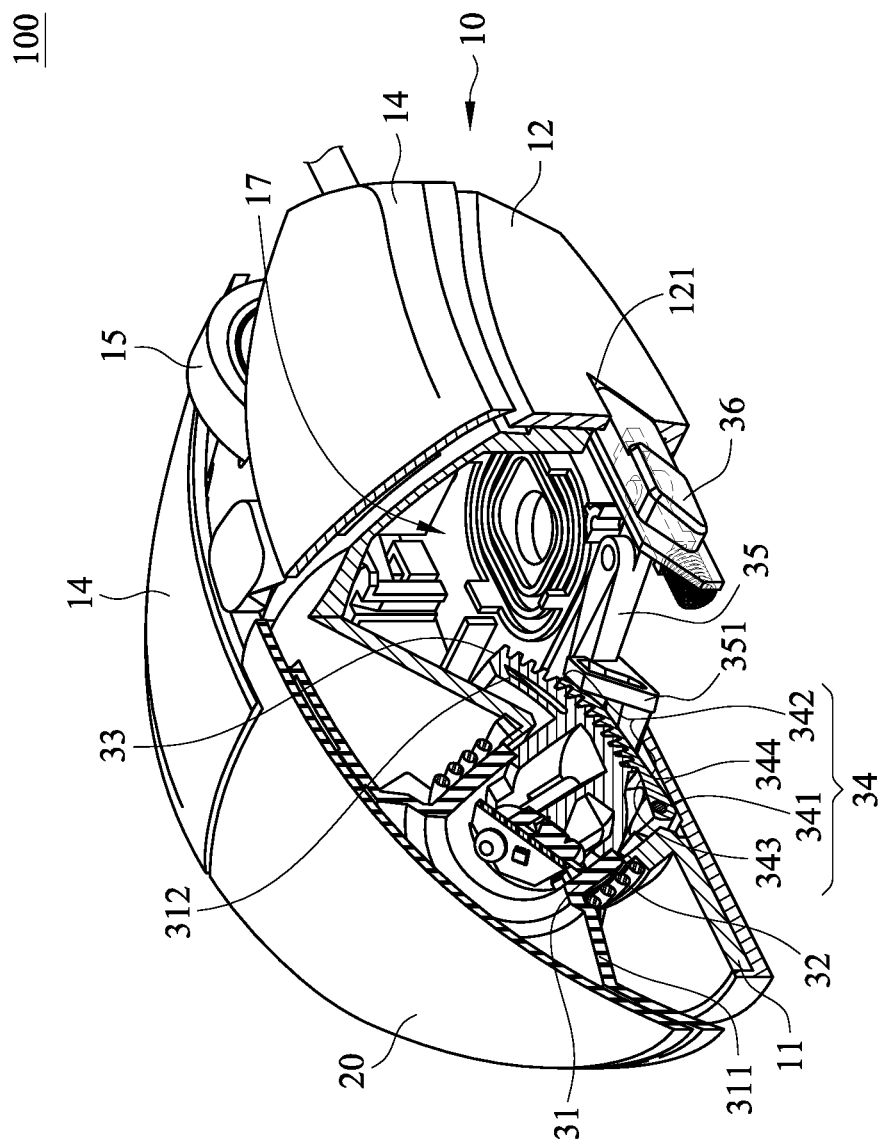
FIG. 2 is a schematic cutaway view illustrating the mouse device according to the embodiment of the present invention.

FIG. 1 is a schematic perspective view illustrating a mouse device with an armrest height adjustment function according to an embodiment of the present invention. FIG. 2 is a schematic cutaway view illustrating the mouse device according to the embodiment of the present invention. The mouse device 100 comprises a mouse body 10, an armrest 20 and an armrest lifting module 30.

Figure 4:
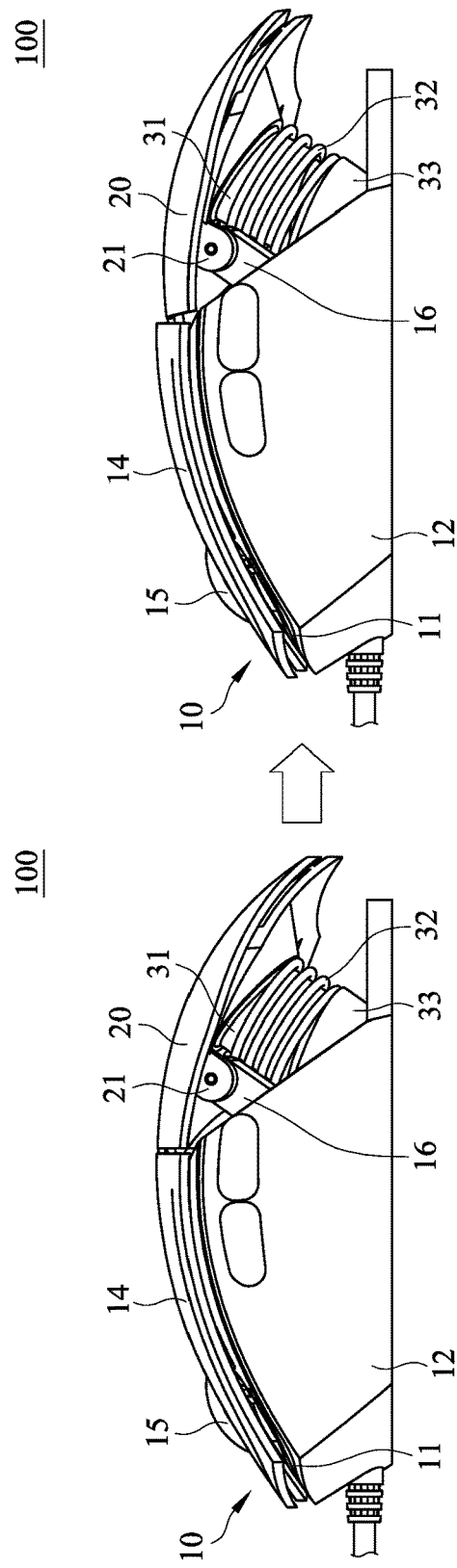
FIG. 4 is a schematic cross-sectional view illustrating a second usage scenario of the mouse device according to the embodiment of the present invention.

The mouse body 10 comprises an upper case 11, a lower case 12, two buttons 14, a roller 15 and two first linkage rods 16 (see FIG. 4). The upper case 11 is covered on the lower case 12. Moreover, an accommodation space 17 is formed between the upper case 11 and the lower case 12. The two buttons 14 and the armrest 20 are covered on the upper case 11. The two buttons 14 are installed on the upper case 11. The armrest 20 is arranged beside the two buttons 14. The roller 15 is installed on the upper case 11 and arranged between the two buttons 14. The two first linkage rods 16 (see FIG. 4) are protruded from the upper case 11 toward the armrest 20. A sliding recess 121 is formed in a surface of the lower case 12. The sliding recess 121 is in communication with the accommodation space 17 of the mouse body 10.

Moreover, two second linkage rods 21 are protruded from the armrest 20 toward the upper case 11. An end of the first linkage rod 16 (see FIG. 4) away from the upper case 11 is pivotally coupled to an end of the corresponding second linkage rod 21 away from the armrest 20. The two first linkage rods 16 (see FIG. 4) and the two second linkage rods 21 are arranged between the armrest 20 and the upper case 11. Moreover, the two first linkage rods 16 (see FIG. 4) and the two second linkage rods 21 are located near the two buttons 14.

The armrest lifting module 30 comprises a support element 31, a height-adjusting elastic element 32, a first coupling element 33, a second coupling element 34, a push element 35 and a slid switch 36. The first coupling element 33, the second coupling element 34 and the push element 35 are disposed within the accommodation space 17 of the mouse body 10.

The two ends of the support element 31 include a connection segment 311 and a free segment 312. The connection segment 311 is connected with the armrest 20. The free segment 312 is penetrated through the upper case 11 of the mouse body 10 and disposed within the accommodation space 17 of the mouse body 10. In this embodiment, the support element 31 is a hollow post. The height-adjusting elastic element 32 is sheathed around the support element 31. The height-adjusting elastic element 32 is arranged between the upper case 11 of the mouse body 10 and the armrest 20. The two first linkage rods 16 and the two second linkage rods 21 are located at two opposite sides of the height-adjusting elastic element 32, respectively. In an embodiment, the height-adjusting elastic element 32 is a spring.

The first coupling element 33 is protruded from the free segment 312 of the support element 31. The first coupling element 33 is an arc-shaped strip with a convex curvy surface 331. The convex curvy surface 331 is located at a side of the first coupling element 33 away from the support element 31. Moreover, the first coupling element 33 further comprises a coupling rack 332 that is formed on the convex curvy surface 331.

The second coupling element 34 is aligned with the coupling rack 332 of the first coupling element 33. An end of the second coupling element 34 has a pivotal end 341. Another end of the second coupling element 34 has an engaging segment 342. The pivotal end 341 is pivotally coupled to the lower case 12 of the mouse body 10. That is, the second coupling element 34 is pivotally coupled to the lower case 12 of the mouse body 10 through the pivotal end 341. The engaging segment 342 is aligned with the coupling rack 332. The engaging segment 342 has a first surface close to the first coupling element 33 and a second surface away from the first coupling element 33. The first surface of the engaging segment 342 is a contact surface 343. The second surface of the engaging segment 342 is a pushed surface 344. The contact surface 343 is a concave curvy surface corresponding to the convex curvy surface 331 of the first coupling element 33. An engaging rack 345 is formed on the contact surface of the second coupling element 34. The engaging rack 345 matches the coupling rack 332. The thickness of the engaging segment 342 is gradually decreased in the direction from the positon near the pivotal end 341 to the position away from the pivotal end 341.

The push element 35 is located under the second coupling element 34. The push element 35 is movable to push the second coupling element 34. A first end of the push element 35 is connected with the slide switch 36. A second end of the push element 35 has a push block 351. The push block 351 is located under the engaging segment 342 to push the pushed surface 344. Preferably, the push block 351 has a slant surface to push the pushed surface 344. The thickness of the push block 351 is gradually decreased in the direction from the position away from the pivotal end 341 to the positon near the pivotal end 341. Moreover, the push block 351 is movable along the pushed surface 344 in the direction from the position away from the pivotal end 341 to the positon near the pivotal end 341. As the push element 35 is moved along the pushed surface 344, the engaging segment 342 is pushed by the push element 35 and rotated upwardly with respect to the pivotal end 341. Consequently, the engaging rack 345 of the second coupling element 34 is engaged with the coupling rack 332 of the first coupling element 33.

The slide switch 36 is installed in the sliding recess 121 of the lower case 12. The slide switch 36 is movable along the sliding recess 121. An end of the push element 35 away from the push block 351 is connected with the slide switch 36.

Figure 3:
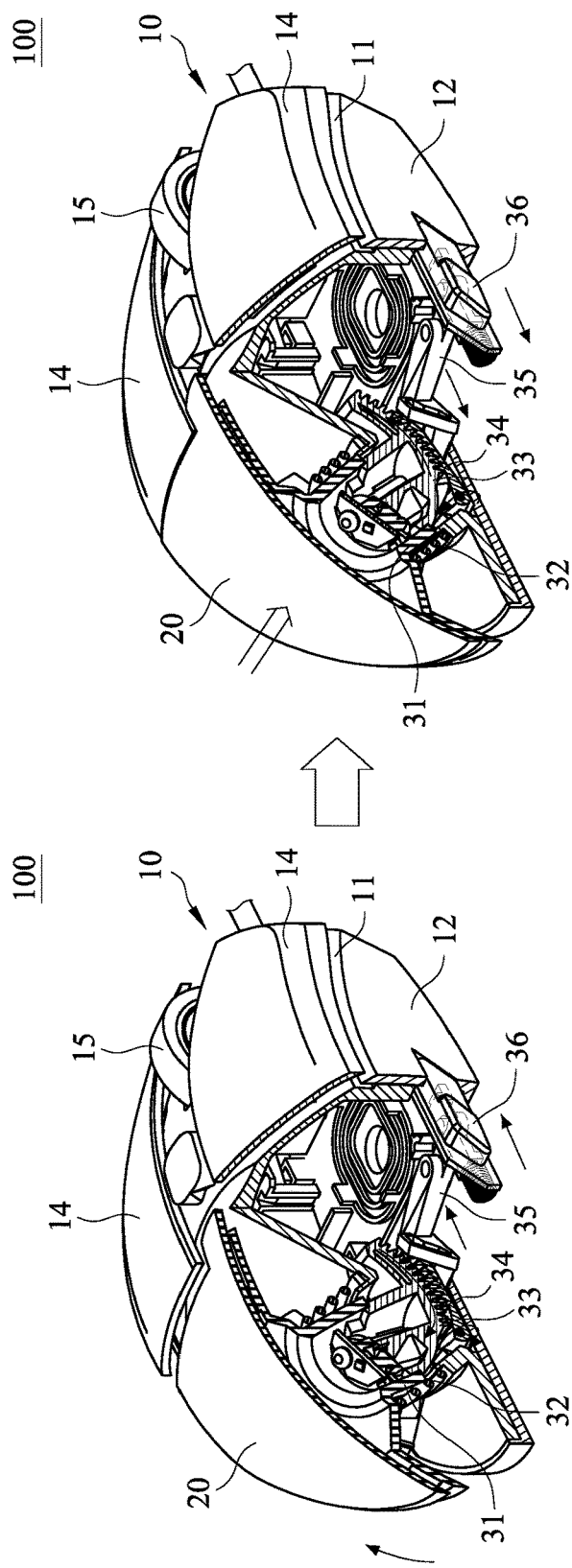
FIG. 3 is a schematic cutaway view illustrating a first usage scenario of the mouse device according to the embodiment of the present invention.

FIG. 3 is a schematic cutaway view illustrating a first usage scenario of the mouse device according to the embodiment of the present invention. FIG. 4 is a schematic cross-sectional view illustrating a second usage scenario of the mouse device according to the embodiment of the present invention.

Before the height of the armrest 20 is adjusted, the height-adjusting elastic element 32 is compressed between the armrest 20 and the upper case 11. For adjusting the height of the armrest 20, the slide switch 36 is moved along the sliding recess 121 in the direction from the position near the armrest 20 to the two buttons 14. As the push element 35 is moved with the slide switch 36 in the direction toward the buttons 14, the push block 351 of the push element 35 is moved along the pushed surface 344 of the second coupling element 34 in the direction away from the pivotal end 341. Under this circumstance, the upward pushing force of the push block 351 on the engaging segment 342 is released. Consequently, the engaging segment 342 of the second coupling element 34 is rotated downwardly with respect to the pivotal end 341 and rotated toward the lower case 12. Meanwhile, the engaging rack 345 that is originally engaged with the coupling rack 332 is moved in the direction away from the coupling rack 332. Consequently, the engaging rack 345 is disengaged from the coupling rack 332 and moved in the direction away from the coupling rack 332. At the same time, the armrest 20 is pushed upwardly in response to the elastic restoring force of the height-adjusting elastic element 32. While the armrest 20 is pushed upwardly, the coupling rack 332 of the first coupling element 33 is rotated along the engaging rack 345 in the direction toward the pivotal end 341.

In case that the user exerts a pressing force on the armrest 20 to press down the armrest 20, the support element 31 is moved downwardly with the armrest 20 and the height-adjusting elastic element 32 is compressed. As the support element 31 is moved downwardly, the coupling rack 332 of the first coupling element 33 is rotated along the engaging rack 345 in the direction away from the pivotal end 341. When the armrest 20 is moved downwardly to a proper position by the user, the slide switch 36 is moved in the direction away from the two buttons 14. As the push element 35 is moved with the slide switch 36 in the direction away from the buttons 14, the push block 351 of the push element 35 is moved along the pushed surface 344 of the second coupling element 34 in the direction toward the pivotal end 341. Consequently, the engaging segment 342 of the second coupling element 34 is rotated with respect to the pivotal end 341 and rotated toward the first coupling element 33. Meanwhile, the engaging rack 345 of the second coupling element 34 is moved in the direction toward the coupling rack 332 of the first coupling element 33. Consequently, the engaging rack 345 of the second coupling element 34 is engaged with the coupling rack 332 of the first coupling element 33. In such way, the armrest 20 is fixed at the required height. The states of the armrest 20 before adjusted and after adjusted are shown in FIG. 4.

Through the armrest lifting module 30, the efficacy of adjusting the height of the armrest 20 is achievable. Since the height of the armrest 20 is adjusted by the user according to the requirement, preference and comfort, the comfort of using the mouse device 100 is enhanced. Moreover, as the height of the armrest 20 is adjusted, the volume of the mouse device 100 is correspondingly changed. Consequently, the volume of the mouse device 100 is adjusted to comply with the size of the user's palm.

As mentioned above, the mouse device 100 further comprises the first linkage rods 16 and the second linkage rods 21. Due to the first linkage rods 16 and the second linkage rods 21, the armrest 20 is not detached from the upper case 11 by the height-adjusting elastic element 32 after the pressing force exerted on the height-adjusting elastic element 32 through the armrest 20 is eliminated.

Moreover, the coupling rack 332 and the engaging rack 345 comprise plural ratchet teeth. Due to the engagement between the ratchet teeth of the coupling rack 332 and the ratchet teeth of the engaging rack 345, the first coupling element 33 and the second coupling element 34 are engaged with each other. Consequently, the coupling force between the first coupling element 33 and the second coupling element 34 is increased. When the mouse device 100 is used by the user and the weight of the user's palm is supported on the armrest 20, the coupling rack 332 and the engaging rack 345 can be securely engaged with each other. Since the armrest 20 provides a sufficient force to support the weight of the user's palm and the coupling force between the first coupling element 33 and the second coupling element 34 is increased, the weight of the user's palm can be supported on the armrest 20. Under this circumstance, the armrest 20 is not moved downwardly.

As mentioned above, the push block 351 has the slant surface to push the pushed surface 344. The slant surface of the push block 351 is gradually descended in the direction from the position away from the pivotal end 341 to the positon near the pivotal end 341. In other words, the push block 351 is a wedge-shaped block. As the second coupling element 34 is pushed by the push block 351 and moved toward the first coupling element 33, the second coupling element 34 is engaged with the first coupling element 33. Under this circumstance, the upward pushing force of the push block 351 exerted on the second coupling element 34 is increased. Consequently, when the weight of the user's palm is supported on the armrest 20 and the support element 31, the second coupling element 34 is not pushed downwardly by the first coupling element 33 and the second coupling element 34 is not disengaged from the first coupling element 33. Moreover, due to the wedge-shape structure of the push block 351, the coupling force between the first coupling element 33 and the second coupling element 34 is increased. Consequently, the structural stability of the mouse device 100 is increased and the use life of the mouse device 100 is prolonged.

Moreover, since the slide switch 36 is located at a side of the lower case 12, the armrest 20 can be fixed or loosened more easily.

From the above descriptions, the mouse device of the present invention has the following features. Firstly, the armrest lifting module 30 is effective to adjust the height of the armrest 20. Secondly, the uses of the coupling rack 332, the engaging rack 345 and the push block 351 can increase the structural stability of the mouse device 100, and thus the use life of the mouse device 100 is prolonged.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A mouse device with an armrest height adjustment function, the mouse device comprising:
   a mouse body;
   an armrest covered on the mouse body and pivotally coupled to the mouse body; and
   an armrest lifting module comprising:
      a support element, wherein two ends of the support element include a connection segment and a free segment, respectively, wherein the connection segment is connected with the armrest, and the free segment is penetrated through the mouse body and disposed within the mouse body;
      a height-adjusting elastic element sheathed around the support element, wherein the height-adjusting elastic element is arranged between the mouse body and the armrest;
      a first coupling element protruded from the free segment, and comprising a coupling rack;
      a second coupling element installed within the mouse body, and aligned with the coupling rack;
      a push element installed within the mouse body, wherein the push element is located under the second coupling element, and the push element is movable to push the second coupling element; and
      a slide switch located at a side of the mouse body and connected with the push element, wherein while the slide switch is moved and the push element is correspondingly moved to push the second coupling element upwardly, the second coupling element is engaged with the coupling rack.

2. The mouse device according to claim 1, wherein the mouse body comprises an upper case and a lower case, wherein the upper case is covered on the lower case, an accommodation space is formed between the upper case and the lower case, and the first coupling element, the second coupling element and the push element are disposed within the accommodation space, wherein the armrest is covered on the upper case and pivotally coupled to the upper case, the free segment is penetrated through the upper case and disposed within the accommodation space, the height-adjusting elastic element is arranged between the upper case and the armrest, and the slide switch is located at a side of the lower case.

3. The mouse device according to claim 2, wherein the mouse body further comprises two first linkage rods, and the two first linkage rods are protruded from the upper case toward the armrest, wherein two second linkage rods are protruded from the armrest toward the upper case, and the first linkage rods are pivotally coupled to the corresponding second linkage rods, wherein the first linkage rods are pivotally coupled to the corresponding second linkage rods, so that the mouse body is connected with the armrest.

4. The mouse device according to claim 3, wherein the two first linkage rods and the two second linkage rods are located at two opposite sides of the height-adjusting elastic element, respectively.

5. The mouse device according to claim 4, wherein the mouse body further comprises two buttons, wherein the two buttons are covered on the upper case, the two buttons are located beside the armrest, and the two first linkage rods and the two second linkage rods are arranged between the armrest and the upper case and located near the two buttons.

6. The mouse device according to claim 2, wherein the first coupling element is an arc-shaped strip with a convex curvy surface, wherein the convex curvy surface is located at a side of the first coupling element away from the support element, and the coupling rack is formed on the convex curvy surface.

7. The mouse device according to claim 6, wherein a first end of the second coupling element has a pivotal end, and a second end of the second coupling element has an engaging segment, wherein the second coupling element is pivotally coupled to the lower case through the pivotal end and connected with the mouse body, and the engaging segment is aligned with the coupling rack.

8. The mouse device according to claim 7, wherein the engaging segment has a first surface close to the first coupling element, and the first surface of the engaging segment is a contact surface, wherein an engaging rack is formed on the contact surface of the second coupling element, and the engaging rack matches the coupling rack.

9. The mouse device according to claim 8, wherein the contact surface is a concave curvy surface corresponding to the convex curvy surface of the first coupling element.

10. The mouse device according to claim 8, wherein the engaging segment has a second surface away from the first coupling element, and the second surface of the engaging segment is a pushed surface, wherein while the push element is moved along the pushed surface, the engaging segment is pushed by the push element and rotated upwardly with respect to the pivotal end, so that the engaging rack is engaged with the coupling rack.

11. The mouse device according to claim 10, wherein a thickness of the engaging segment is gradually decreased in a direction from a positon near the pivotal end to a position away from the pivotal end.

12. The mouse device according to claim 10, wherein a first end of the push element is connected with the slide switch, and a second end of the push element has a push block, wherein the push block is located under the engaging segment to push the pushed surface, and the push block is movable along the pushed surface in a direction from a position away from the pivotal end to a positon near the pivotal end.

13. The mouse device according to claim 12, wherein the push block has a slant surface near the pushed surface, wherein a thickness of the push block is gradually decreased in a direction from a position away from the pivotal end to a positon near the pivotal end.

14. The mouse device according to claim 12, wherein a sliding recess is formed in a surface of the lower case and in communication with the accommodation space, wherein the slide switch is installed in the sliding recess and movable along the sliding recess, wherein an end of the push element away from the push element is connected with the slide switch.

15. The mouse device according to claim 1, wherein the height-adjusting elastic element is a spring, and the support element is hollow post.

* * * * *